(12) United States Patent
DeLisio

(10) Patent No.: US 8,899,608 B2
(45) Date of Patent: Dec. 2, 2014

(54) INTERCHANGEABLE TRAILER HITCH ASSEMBLY

(71) Applicant: Carmen J DeLisio, Mentor, OH (US)

(72) Inventor: Carmen J DeLisio, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 13/788,397

(22) Filed: Mar. 7, 2013

(65) Prior Publication Data

US 2014/0183840 A1 Jul. 3, 2014

Related U.S. Application Data

(60) Provisional application No. 61/746,779, filed on Dec. 28, 2012.

(51) Int. Cl.
*B60D 1/07* (2006.01)
*B60D 1/14* (2006.01)
*B60D 1/52* (2006.01)

(52) U.S. Cl.
CPC *B60D 1/52* (2013.01); *B60D 1/143* (2013.01); *B60D 1/07* (2013.01)
USPC .................................................. 280/416.1

(58) Field of Classification Search
USPC .............. 280/415.1, 416.1, 491.1, 511, 515
See application file for complete search history.

(56) References Cited

U.S. PATENT DOCUMENTS

| | | | | |
|---|---|---|---|---|
| 2,954,255 A | * | 9/1960 | Bates | 293/145 |
| 3,807,765 A | * | 4/1974 | Pokornicki | 280/433 |
| 3,837,679 A | * | 9/1974 | Dickmann | 280/491.5 |
| 3,951,434 A | * | 4/1976 | Sause | 280/416.1 |
| 4,243,342 A | * | 1/1981 | Marto | 403/324 |
| D281,489 S | * | 11/1985 | Hancock | D12/162 |
| 4,552,377 A | * | 11/1985 | Folkerts | 280/515 |
| 4,871,185 A | * | 10/1989 | Chakroff et al. | 280/477 |
| 5,860,671 A | * | 1/1999 | Mackeown | 280/511 |
| 6,186,693 B1 | * | 2/2001 | Cloyd et al. | 403/122 |
| 6,712,381 B1 | * | 3/2004 | Moss | 280/491.1 |
| 6,802,523 B1 | * | 10/2004 | Profitt | 280/507 |
| 6,969,085 B2 | * | 11/2005 | Causey, Jr. | 280/507 |
| 7,673,894 B2 | * | 3/2010 | Bender | 280/406.1 |
| 7,926,829 B2 | * | 4/2011 | Bender | 280/406.1 |
| 2002/0047247 A1 | | 4/2002 | Moss | |
| 2009/0039616 A1 | | 2/2009 | Bender | |
| 2010/0127479 A1 | * | 5/2010 | Weipert et al. | 280/491.1 |
| 2011/0074133 A1 | * | 3/2011 | Sparkes et al. | 280/515 |
| 2012/0217724 A1 | | 8/2012 | Works | |

FOREIGN PATENT DOCUMENTS

CA 2279021 A1 1/2001

OTHER PUBLICATIONS

International Search Report and Written Opinion of the International Searching Authority mailed Apr. 25, 2014.

* cited by examiner

*Primary Examiner* — Joseph M Rocca
*Assistant Examiner* — Gabriela C Craciun
(74) *Attorney, Agent, or Firm* — Hahn Loeser & Parks LLP

(57) ABSTRACT

An interchangeable hitch assembly including a hitch member supported on a hitch post, the hitch member including plural hitches each in a separate radial position, where the hitch member is rotable to place one of the hitches in a selected position for attachment, a locking assembly adapted to hold the one of the hitches in said selected position.

13 Claims, 3 Drawing Sheets

INTERCHANGEABLE TRAILER HITCH ASSEMBLY

RELATED APPLICATION DATA

The present invention claims priority from U.S. provisional patent application No. 61/746,779 filed on Dec. 28, 2012 which is incorporated by reference herein.

TECHNICAL FIELD

The present invention relates to a trailer hitch assembly. More particularly, the present invention relates to an interchangeable trailer hitch assembly having a hitch member that includes plural hitches and is mounted so that it can be rotated to select the appropriate hitch and lock the assembly in the selected rotational position.

BACKGROUND OF THE INVENTION

Two wheel trailers are often used to transport larger welders. When a larger welder needs to be moved, it is typically attached to a vehicle by an appropriate hitch. Vehicles and trailers may be equipped with a variety of hitches leading to instances where the hitch receiver and hitch on a given trailer and vehicle pair do not match. The term vehicle, as used herein, will include ordinary meaning of the word and any other structure that has a hitch ball or other member to which a hitch may be attached and the trailer moved including for example, trailer dollies, fork-lifts, motor vehicles, tractors, four wheelers, snow-mobiles, and the like.

In a fleet operation, this may lead to considerable time spent searching for a two wheel trainer having the appropriate hitch/receiver to match the hitch/receiver on the transporting vehicle. In this regard, trailers with interchangeable hitches have been provided. In particular, trailers have been provided with a hitch assembly that contains two of the most common hitch types i.e. a two inch ball hitch and lunette eye hitch separately bolt on to the trailer. In this way, a trailer hitch matching the vehicle's hitch is provided to the vehicle operator and then bolted to the trailer. While this avoids searching through a fleet of trailers to find a matching hitch, this type of interchangeable hitch requires time and tools to install it before the trailer can be moved.

SUMMARY OF THE INVENTION

The present invention generally relates to an interchangeable hitch assembly including a hitch member supported on a hitch post, the hitch member including plural hitches each in a separate radial position, where the hitch member is rotable to place one of the hitches in a selected position for attachment, a locking assembly adapted to hold that hitch in the selected position.

The present invention further relates to an interchangeable hitch assembly including a tubular base; a hitch post rotatably supported within the tubular base; a hitch member supported on the hitch post, the hitch member including plural hitches each extending outward from the hitch post in a separate radial position, wherein the hitch post is rotatable within the tubular base to place one of said hitches in a selected position for attachment; and a locking assembly adapted to hold the one of the hitches in the selected position.

The present invention still further relates to an interchangeable hitch assembly having a hitch member including plural hitches. According to one aspect of the invention, hitch member includes a lunette-eye hitch and a ball hitch. According to another aspect of the invention, the lunette-eye hitch and ball hitch are on opposite ends of hitch member and face outwardly relative to each other. The hitch member is rotatably mounted to selectively position one or the plural hitches in an outward facing position. According to another aspect of the invention, a locking member is provided to fix the rotational position of the hitch member. According to another aspect of the invention, hitch member is mounted on a post that rotates to allow the appropriate hitch to extend outward from the trailer for attachment to a vehicle.

According to another aspect of the invention, the post is mounted within a tubular base that allows for rotation of the post within the tubular base. Plural openings are provided on one or both of the post and the tubular base to allow fixation of the post at a selected height by inserting a pin through corresponding openings in the cylinder and the post.

DETAILED DESCRIPTION OF THE INVENTION

Figure 1:
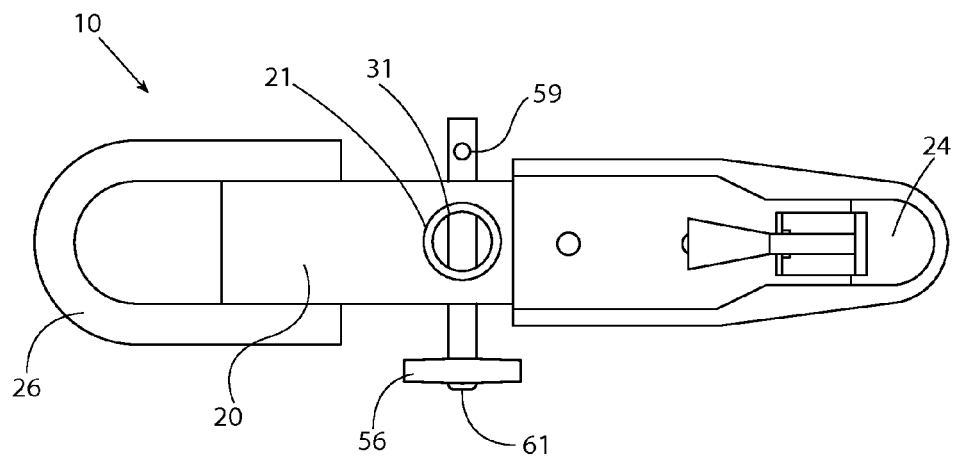
FIG. 1 is a top plan view of an interchangeable hitch assembly according to the invention.
Figure 2:
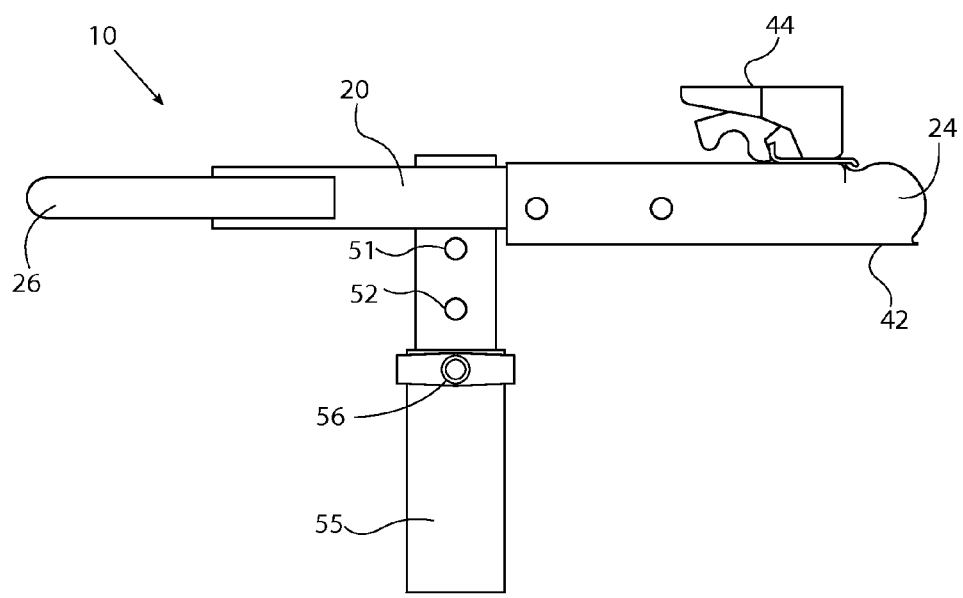
FIG. 2 is a right side elevational view thereof.
Figure 3:
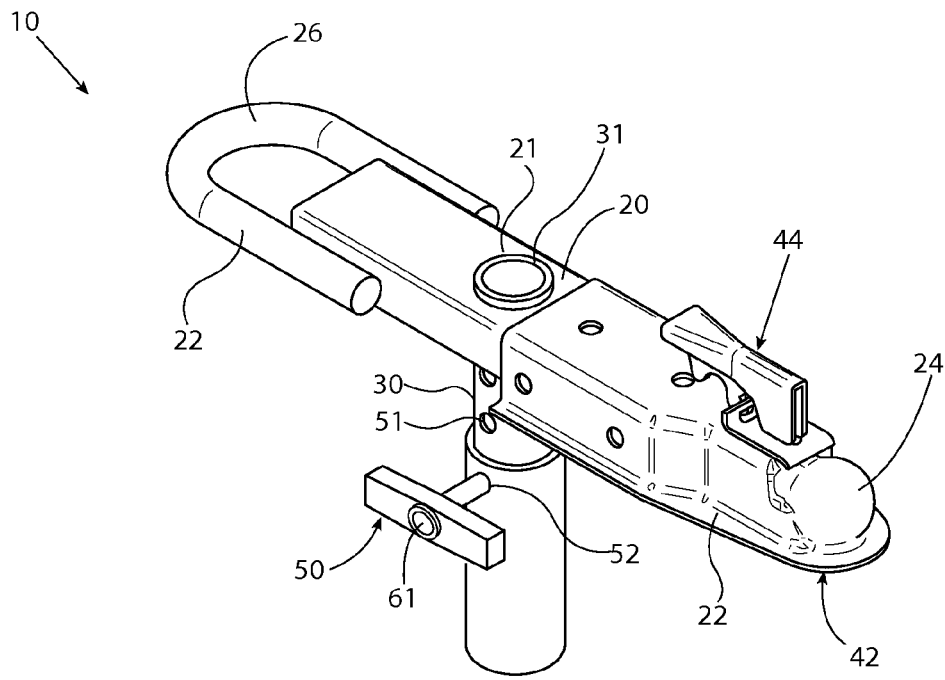
FIG. 3 is a perspective view thereof.
Figure 4:
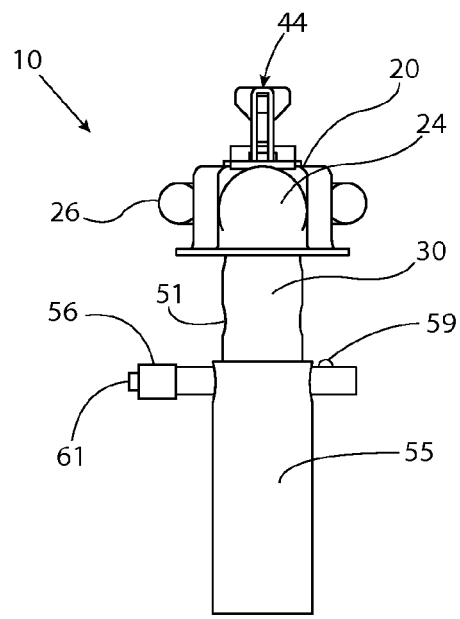
FIG. 4 is a front elevational view thereof.
Figure 5:
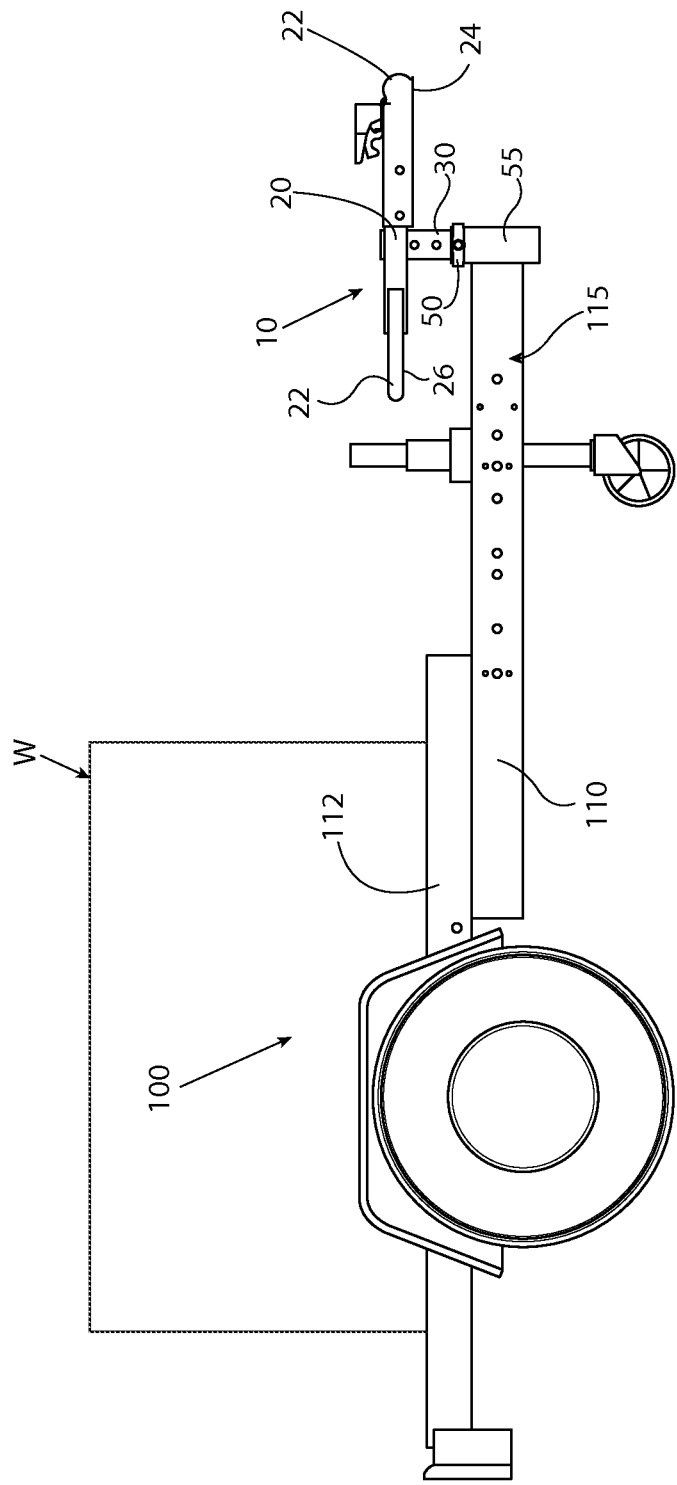
FIG. 5 is a side elevational view of an interchangeable hitch assembly mounted on a trailer.

An interchangeable hitch assembly according to the concepts of the present invention is generally indicated by the number 10 in the accompanying drawings. Hitch assembly 10 is used in connection with a trailer 100. The trailer 100, shown, is a two wheel trailer and is provided merely as an example. It will be appreciated that the interchangeable assembly 10 may be used in connection with other trailers. Trailer 100 includes a frame 110. Frame 110 includes a bed portion 112 on which a load is supported. In the example shown, bed portion 112 is used to support welding equipment W including large scale welders, power supplies, inverters, and related equipment that must be towed behind a vehicle. It will be appreciated that the trailer 100 may be used for other similar applications, for example, large scale portable generators, lighting equipment, and the like. A nose portion, generally indicated by the number 115 extends forward from bed portion 112.

An interchangeable hitch assembly 10 according to the concepts of the present invention is supported on nose portion 115. Hitch assembly 10 generally includes a hitch member 20 supported on a hitch post 30.

Hitch member 20 is rotatable so that the selected hitch 22 may be rotated into a position for attachment to the vehicle. In that regard, the hitch member 20 may rotate about the hitch post 30, or, as shown, hitch member 20 may fixed to hitch post 30 and hitch post 30 is rotatable to achieve the same effect. Hitch member 20 may be of any shape or length. In the example shown, hitch member 20 includes a rectangular length of channel iron defining a central bore 21 through which the end 31 of hitch post 30 extends. Hitch member 20 may be attached to hitch post 30 in any known manner including a fastener or a weld.

In the example shown, hitch member 20 includes two hitches 22 at either end of the hitch member 20. This example is not limiting as more than two hitches 22 may be included in hitch member 20. Each hitch 22 may be of a different size or type to allow the user to match the hitch to the hitch ball or other attachment on the vehicle. In the example shown, the first hitch 24 and the second hitch 26 are diametrically opposed from each other such that the hitch post 30 undergoes a 180° rotation to substitute one hitch 22 for the other in the forward facing position. As shown, first hitch 24 may be a ball hitch defining a ball receiver 42 and carrying appropriate latch assembly 44 to secure the ball hitch 24 to a hitch ball on a vehicle. Second hitch 26 may be a lunette eye. These two examples are provided for the most commonly used hitches, but should not be considered limiting a any other hitch may be provided as needed for a given application.

A locking assembly 50 is provided to hold hitch post 30 against further rotation once the hitch member 20 is in the desired position. In the example shown, locking assembly 50 includes a first receiver 51 formed in hitch post 30 and a second receiver 52 formed in an adjacent fixed surface. For example, hitch post 30 may be mounted within a tubular base 55 that defines second receiver 52. When the hitch post 30 is in the desired position, first and second receivers 51, 52 are aligned. A lock pin 56 may then be inserted to prevent further rotation of the hitch post 30. Lock pin 56 may be any member that can be inserted through both receivers 51,52 to prevent relative movement between the hitch post 30 and base 55. To secure the lock pin 56 against axial movement, lock pin 56 may include a cotter pin, a rectangle ball, safety wire, or other fastener 59 to hold the lock pin against axial movement that would cause it to disengage one or both of the receivers 51,52. In the example shown, lock pin 56 is a ball lock pin having a selectively retractable ball bearing that hold the axial position of the pin. A button 61 or other release mechanism is provided to retract the ball allowing the lock pin 56 to be quickly removed. For security purposes, the lock pin 56 may include a lock that requires a key or combination before it can be removed.

In accordance with another aspect of the invention, first and second receivers 51,52 may include multiple openings to accommodate multiple rotational positions. In the example shown, since the hitches are diametrically opposed a single opening extending through the hitch post 30 will accommodate both positions. It will be appreciated that openings at other circumferential positions may be provided to lock the hitch post 30 at rotational positions between 0 and 180 degrees.

In accordance with another aspect of the invention, second receiver 52 may include multiple openings in the vertical direction to provide a height adjustment for the hitch member 20. As shown, second receiver 52 may include a column of openings formed in base 55. To adjust the height of hitch member 22, first receiver 51 may be aligned with any one of these openings before lock pin 56 is inserted to set the position of hitch member 20. Such height adjustment may be used to align hitch member 20 with the hitch ball or other hitching device on the vehicle to ensure that the trailer nose is in the proper position relative to the vehicle.

As will be appreciated, the height adjustment, like the switching between hitches, may be accomplished without any tools. In the examples shown, a single lock pin 56 is used to set the height and rotational position of hitch member 20. These functions may be performed by separate lock assemblies 50 as an option.

What is claimed:

1. An interchangeable hitch assembly comprising:
   a hitch member supported on a hitch post, the hitch member including plural hitches each in a separate radial position, where the hitch member is rotatable to place one of said hitches in a selected position for attachment;
   a locking assembly adapted to hold said one of said hitches in said selected position;
   wherein said hitch member includes a lunette eye hitch and a ball hitch;
   wherein said lunette eye hitch and said ball hitch are diametrically opposed on said hitch member, and
   wherein said hitch member includes a length of channel iron defining a central bore to receive said hitch post, said channel iron extending outward from opposite sides of said hitch post, and wherein said lunette eye hitch and said ball hitch are mounted on a respective end of said channel iron.

2. The interchangeable hitch assembly of claim 1, wherein said hitch post defines a first receiver and said tubular base defines a second receiver, and wherein said lock assembly includes a lockpin insertable through said first receiver and said second receiver.

3. The interchangeable hitch assembly of claim 2, wherein said lockpin is a ball lock pin.

4. The interchangeable hitch assembly of claim 2, wherein said first receiver includes a column of vertically spaced openings, wherein said second receiver is alignable with a selected of said openings and said lockpin inserted therethrough to set a height of said hitch member.

5. The interchangeable hitch assembly of claim 1 further comprising a trailer having a frame that includes a bed portion and a nose portion, wherein said hitch post is attached to said nose portion.

6. The interchangeable hitch assembly of claim 5 further comprising a welding equipment supported on said bed portion.

7. An interchangeable hitch assembly comprising:
   a tubular base;
   a hitch post rotatably supported within said tubular base;
   a hitch member supported on said hitch post, said hitch member including plural hitches each extending outward from said hitch post in a separate radial position, wherein said hitch post is rotatable within said tubular base to place one of said hitches in a selected position for attachment; and
   a locking assembly adapted to hold said one of said hitches in said selected position;
   wherein said locking assembly includes a first receiver formed in said hitch post and a second receiver formed in said tubular base, and a lockpin extending through said first and second receivers; and
   wherein said first receiver includes a bore extending through said hitch post, and said second receiver includes a pair of diametrically opposed openings formed in said tubular base and aligned with each other, and wherein said lockpin extends through said openings in said tubular base and said bore.

8. The interchangeable hitch assembly of claim 7, wherein said first receiver includes plural openings arranged in a vertical column for each of said selected positions.

9. The interchangeable hitch assembly of claim 7, wherein said plural hitches are diametrically opposed on said hitch member.

10. The interchangeable hitch assembly of claim 7, further comprising a fastener supported on said lockpin selectively to hold said lockpin against axial movement after said lockpin is inserted through said first and second receivers.

11. The interchangeable hitch assembly of claim 9, wherein said lockpin is a ball lockpin and wherein said fastener is a retractable ball actuated by a button on said ball lockpin.

12. The interchangeable hitch assembly of claim 7, further comprising a trailer having a bed portion and a nose portion, wherein said tubular base is attached to said nose portion.

13. The interchangeable hitch assembly of claim 7, wherein said hitch member includes a lunette eye hitch and a ball hitch.

* * * * *